Nov. 10, 1953
H. F. HOWARD
2,658,745
CLOTHES SCALE FOR WASHING MACHINES
Filed June 26, 1950
2 Sheets-Sheet 1
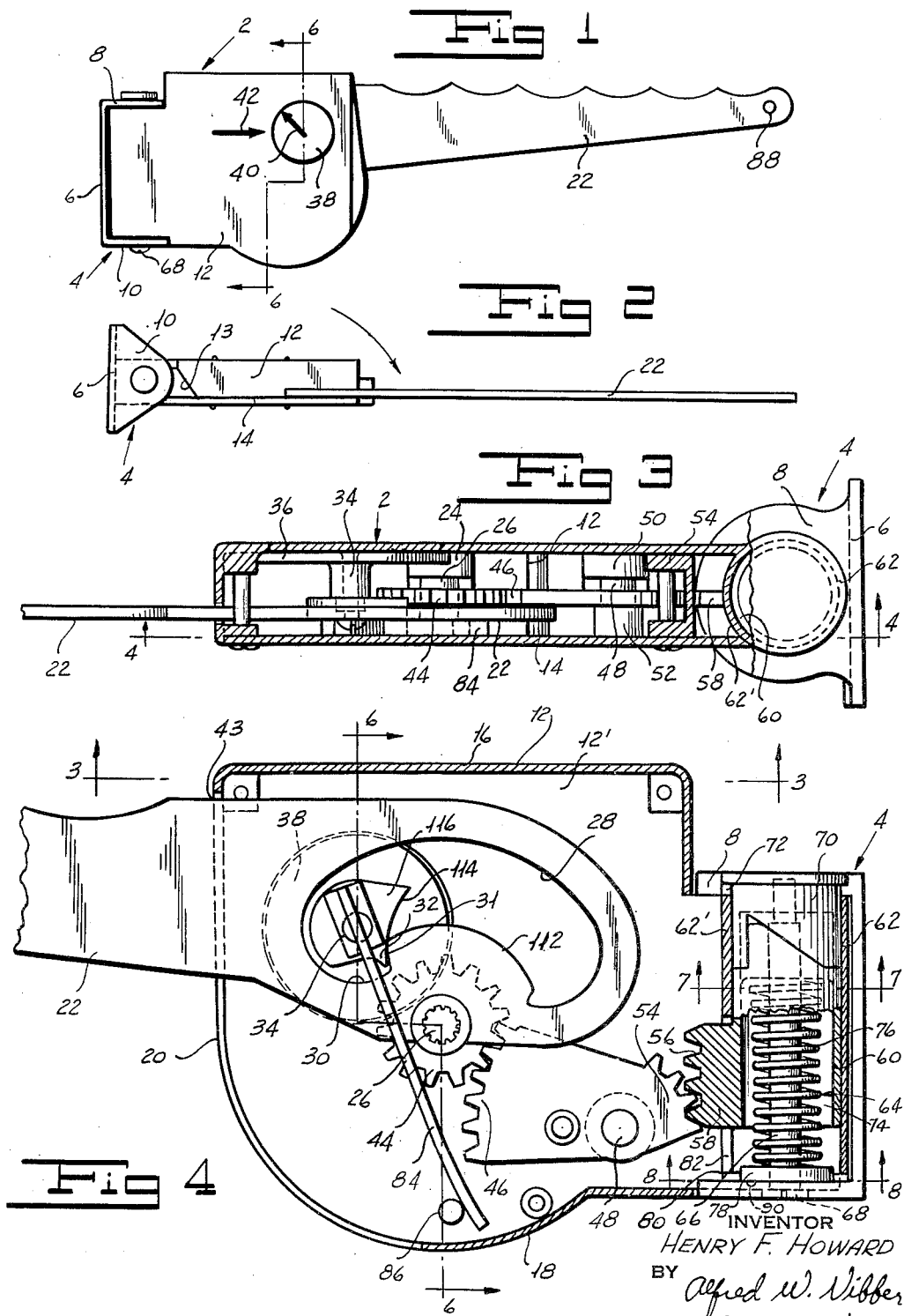
INVENTOR
HENRY F. HOWARD
BY Alfred W. Vibber
ATTORNEY Nov. 10, 1953 H. F. HOWARD 2,658,745
CLOTHES SCALE FOR WASHING MACHINES
Filed June 26, 1950 2 Sheets-Sheet 2
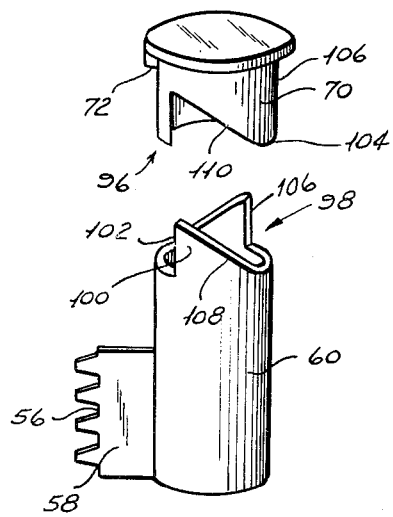
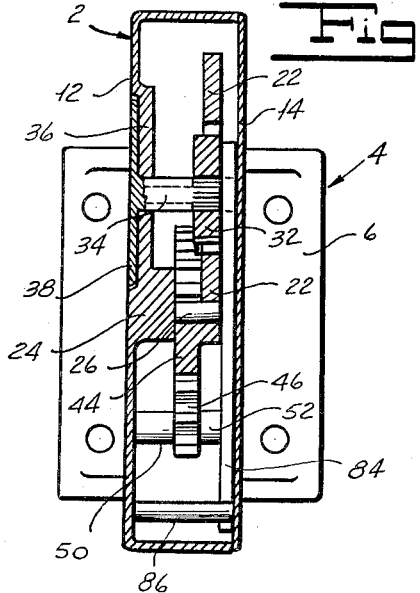
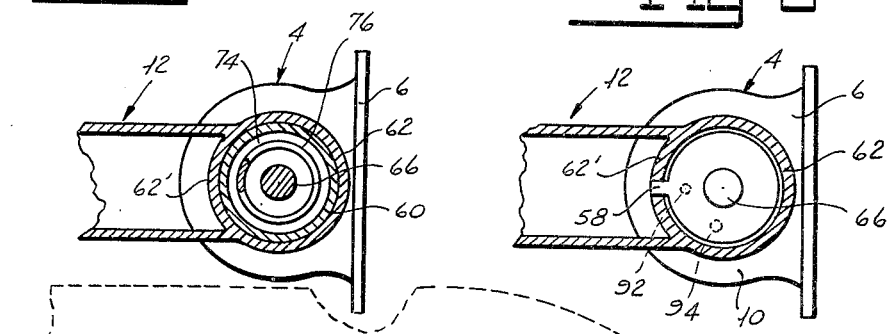
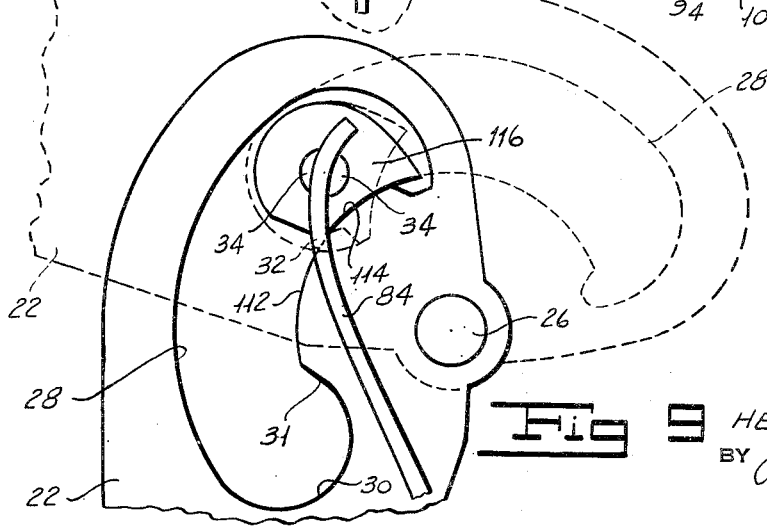
INVENTOR
HENRY F. HOWARD
BY Alfred W. Vibber
ATTORNEY Patented Nov. 10, 1953

2,658,745

UNITED STATES PATENT OFFICE 2,658,745

CLOTHES SCALE FOR WASHING MACHINES

Henry F. Howard, Paterson, N. J., assignor of one-fourth to Alfred W. Vibber and five per cent to John Gemmink, both of Paterson, N. J.

Application June 26, 1950, Serial No. 170,365

12 Claims. (Cl. 265—68)

1

This invention relates to a weighing device or scale, such device being particularly adapted for mounting on a washing machine, whereby the operator may weigh the clothes going into the machine and may thus be assured of not overloading such machine.

This application is a continuation-in-part of application Serial No. 127,409, filed November 15, 1949, now Patent No. 2,631,839, and bearing the same title as the instant application.

Modern washing machines for use in the home are designed to take certain maximum loadings. If such maximum loading for a particular machine is exceeded, the clothes in such batch will usually be washed inadequately, due to the fact that the washing machine will not, when thus overloaded, operate in its most efficient manner. With some types of washing machines, such overloading also introduces the possibility of stalling the driving mechanism and thereby injuring the machine or ruining it. With washing machines of the centrifugal type, such as the "Bendix" and the "Westinghouse Laundromat," overloading of such machines leads to their serious unbalance, and is liable to injure the suspension mechanism for the clothes containing drum.

It is accordingly among the general objects of the invention to provide an improved scale, particularly adapted for application to washing machines, so that the operator may be assured that he is not overloading the machine.

More particularly the invention is directed to the provision of a scale, particularly adapted for weighing clothes, of novel, simplified, and improved construction.

Yet a further object of the invention resides in the provision of a scale of the type indicated which is particularly adapted and designed for mounting upon a washing machine, the scale being of such construction that it is readily calibrated for any particular maximum load over an appreciable range, such that it will quickly and accurately show when such maximum load is reached, and also such that the scale throws off the load of clothes when the predetermined load is exceeded.

A still further object of the invention resides in the provision, in the scale of the invention, of means whereby the scale may be swung to an inoperative position, the preferred illustrative embodiment of the scale combining with such pivoting support means automatically to allow the clothes scale lever to pivot vertically downwardly to a retracted, inoperative position.

These and further objects of the invention will be more readily apparent in the following description of a preferred embodiment of the scale of the invention.

In the accompanying drawings forming a part of the specification:

Fig. 1 is a view in side elevation of a preferred embodiment of the clothes scale of the invention;

Fig. 2 is a view in bottom plan of the scale of Fig. 1;

Fig. 3 is a view in horizontal section through the scale, the section being taken along the line 3—3 in Fig. 4;

Fig. 4 is a view in vertical section through the scale, the section being taken along the line 4—4 in Fig. 3;

Fig. 5 is a view in perspective of the cap portion of the pivot pin and of the spring pressed plunger of the apparatus cooperating therewith;

Fig. 6 is a view in vertical section through the main housing portion of the scale, the section being taken along the line 6—6 in Figs. 1 and 4;

Fig. 7 is a view in horizontal section through the rear pivot portion of the scale, the section being taken along the line 7—7 in Fig. 4;

Fig. 8 is a similar view in horizontal section through the rear end of the housing of the scale, the section being taken along the line 8—8 in Fig. 4; and Fig. 9 is a fragmentary view of the device, shown in a manner similar to Fig. 3, with the parts in the position they assume when the scale is overloaded.

In the preferred embodiment of the clothes scale shown, there is provided a main housing for such scale, such main housing being generally designated by the reference character 2. Main housing 2 is adapted to be supported in a vertical plane and is adapted to be pivoted about a vertical axis, being supported for such pivotal motion by means of the bracket generally designated 4. The rear main portion of the bracket, designated 6, is flat in this instance, being adapted to be attached to a flat wall surface of a washing machine by means of bolts or screws extending through the holes shown in portion 6. It will be appreciated that, if the clothes scale is to be applied to a washing machine with a curved wall or tub, the portion 6 of the bracket will be curved so as to be complementary to such surface of the machine. If the bracket is to be mounted directly on the tub of the washing machine, a sealing gasket will be interposed between part 6 of the bracket and the tub. Bracket 4 has an upper horizontal arm 8 and a lower horizontal arm 10, between which the rear end portion of housing 2 is located.

Housing 2 is composed of a main body portion 12 of shallow box-like construction, portion 12 being preferably formed as an integral die-casting. Portion 12 of the housing serves as the main support for the scale lever and for the various driving and indicating gears, shafts, etc., to be described. Portion 12 is provided with a top horizontal flange portion 16 and a bottom flange portion 18, shown more clearly in Fig. 4, there being a slot 20 through the flange portion on part 12 at the forward end of the housing 2 to accommodate the vertical swinging action of the clothes scale lever 22. The bottom flange portion 18 of part 12 is cut away on a bias, as shown at 13 in Fig. 2, to allow the clockwise pivoting of the housing 2 from the operative position shown in Fig. 2, as indicated by the curved arrow, to an inoperative position at right angles to such operative position.

Scale lever 22, which is narrow in horizontal section and wide in vertical section as indicated in Figs. 1 and 2, is provided on the rear end thereof with a somewhat vertically expanded portion at which the lever is pivotally supported on a horizontal axis in housing 12 and by means of which the lever is connected, in a manner to be described, to both the indicating mechanism and to the spring driving mechanism for the scale lever. Laterally projecting from the inner surface of the broad vertical part 12' of the housing is the pedestal 24, preferably formed integrally therewith, such pedestal having an outer portion 26 of reduced diameter which forms the pivot pin for the inner end of the lever 22. Such construction is more clearly shown in Fig. 6. Lever 22 is retained upon the pivot pin 26 by reason of the substantial engagement between the surface of such lever and the inner surface of the cover plate 14 which is attached to the flanges 16 and 18 of the housing by screws, in the manner shown in Fig. 3.

The inner end of lever 22 is provided, as shown in Fig. 4, with a partially annular slot 28 which lies above pivot pin 26 and is coaxial therewith. On the bottom surface of slot 28 there is provided, on the end at the left in Fig. 4, a depression 30 the right-hand wall 31 of which (Fig. 4) functions as one tooth of a gear. When the parts are in the position shown in Fig. 4, surface 31 is in contact with the small, one-toothed, pinion 32 which is keyed, as is more clearly shown in Fig. 6, on the outer end of the shaft 34. Shaft 34 extends through and is rotatably supported in a bore through the thickened side wall portion 36 of the housing part 12, as shown in Fig. 6. There is a circular well or depression on the outer face of wall portion 36, such well receiving the indicating disc 38 which is affixed to, and is preferably made integral with, the shaft 34 at its outer end. The outer surface of indicating disc 38 is provided with an arrow 40, such arrow cooperating with the fixed indicating arrow 42 on the outer surface of housing part 12.

When the lever 22 is in its operative position and has no load thereon, it lies in the position shown in Figs. 1 and 4. The lever is stopped in such position by reason of the engagement between its upper surface and the terminal point 43 on the forward flange of housing portion 12. It will be apparent that rotation, within appreciable angular limits, in this instance from 0 to 20° from the horizontal of lever 22 in a clockwise direction, as the device is shown in Fig. 1, will result in the driving of indicating disc 38 in a counterclockwise direction, by reason of the engagement between the surface 31 and the one-toothed gear 32. Means to be described are provided to oppose such clockwise rotation of lever 22 in such manner that the opposing force increases with the increasing torque imposed upon lever 22. Accordingly, when arrow 40 of disc 38 confronts the arrow 42, with the choice of suitable constants for the total opposing force, there will be imposed on lever 22 a force corresponding to the calibrated maximum for which the scale is designed and set.

The total opposing force on lever 22 is supplied by two means, one of which is a spring pressed plunger and the other of which is a leaf spring. The spring pressed plunger is constructed and functions as follows. The end of lever 22 within housing 2 is provided on the surface remote from the cover plate 14 with a gear 44 coaxial with pivot pin 26. Gear 44 is fixedly attached to lever 22, and is preferably made integral therewith. Meshing with such gear 44 is a partial, larger, gear 46 which is pivotally mounted upon the pivot pin 48. Pin 48, as shown in Fig. 3, is formed as the outer end of reduced diameter of the pedestal 50 which protrudes from the inner surface of housing part 12. Gear 46 is maintained upon pin 48 by means of the pad 52 protruding from the inner face of the cover plate 14. The portion of partial gear 46 to the right, as it is shown in Fig. 4, is of smaller diameter, such portion being provided with a partial gear 54. Gear 54 meshes with the rack gear 56, the rack gear being affixed to the outer surface of a vertically reciprocable key member 58 protruding from the plunger 60. Plunger 60 will be more fully described hereinafter.

The rear end of the main housing member 12 of the scale is formed, in effect, as a tube, the tube, as shown in Figs. 3 and 4, having a rear wall 62 and a forward wall 62'. Within the thus described tube is a composite pivot pin generally designated 64. Such pin, which connects housing 2 to bracket 4, is composed of a vertically disposed stud member having a stem 66 and a head 68 at the bottom thereof. The upper end of the stem 66 of the stud member is screwed into the cap portion 70 which has an enlarged head and a slightly smaller stem, the stem fitting down into the top of the tube formed by the wall portions 62 and 62'. The stud member and the cap 70 extend, as shown, between the upper and lower arms of the bracket member 4, thereby attaching the scale body 12 to such bracket. The thus described pivot pin is prevented from rotation with respect to the bracket 4 by reason of a radial key member 72 protruding from the cap member 70, such key member engaging within a depression in the upper arm of the bracket, as shown in Fig. 3.

Slidably fitting within the bore through the tubular portion of the rear end of the housing in the lower end thereof is the vertically reciprocable plunger 60. Member 60 at its upper portion snugly and slidably fits about the stem member 66 and is provided at its medial and lower end portions with a counterbore 74. Contained within the counterbore and bearing against the upper end thereof is a coil compression spring 76 which constantly urges plunger 60 in an upward direction. The lower end of spring 76 rests upon the spring seat providing washer member 78 resting upon the upper surface of arm 10 of the bracket, member 78 being restrained from rotation with respect to the housing 12 by the radial key member 80 on the washer. Key member 80 fits within the vertical slot 82 through wall 62' of the tubular rear end of the housing, the above described key member 58 on plunger 60 reciprocating in such slot.

Considering Fig. 4 particularly, it will be seen that when a load is imposed upon scale arm 22, thus rotating the arm counterclockwise about its pivotal axis as the device is shown in Fig. 3, the gear 54 as a result will be rotated clockwise. Such clockwise rotation of gear 54 drives the rack gear 56 downwardly, carrying with it plunger member 60 and thus progressively compressing the coil spring 76. It will be appreciated that the rotation of indicating disc 38, within the angular limits of engagement between gears 30 and 32, will thus bear a predetermined relationship with the amount of torque imposed upon lever 22 and thus the amount of clothes or other materials hung upon such lever.

To the torque imposed upon the lever 22 by means of the compression coil spring 76, above described, is an added torque imposed by a leaf spring 84 which is provided in the present improved clothes scale, to reduce the size of the coil spring necessary to cause the scale to weigh clothes in the desired range of weight. Leaf spring 84 is operative thus to add to the force opposing deflection of lever 22 over, for example, the full weighing range of 0 to 9 pounds, and the overload range of from 9 to 10½ pounds. The leaf spring 84, shown in Figs. 3 and 8, is mounted with its upper end pinned to the bifurcated inner end of shaft 34. Spring 84 is so located that it overlies gears 44, 46, and 54 and is laterally spaced therefrom, as shown in Fig. 8. The lower end of spring 84 slidingly contacts the laterally projecting pin 86 on housing 12, when shaft 34 is rotated clockwise as the device is shown in Fig. 4, so that spring 84 is progressively increasingly flexed as shaft 34 turns in response to deflection of scale lever 22. The coil spring 76 is so chosen, leaf spring 84 is so connected to shaft 34 angularly thereof, and pin 86 is so located in housing 12 that spring 84 contacts pin 86 thus to add to the effect of coil spring 76 in opposing deflection of lever 22 in this embodiment, over the full range of the weight imposed upon the outer end of lever 22.

Because clothing will in the main be hung upon the lever in the same manner, time after time, no localized point of hanging of the clothes on the lever is usually necessary. As shown, however, the upper edge of lever 22 is preferably scalloped, to aid in placing the clothing on the lever in approximately the same place at each use, and also to prevent the clothes from sliding off the lever upon deflection of the latter within its operative range. Calibration of the scale will be effected after a large number of tests of the random disposal of clothing upon the scale lever, and thus the reading of the scale in operation will be accurate within a close enough tolerance for the purpose in hand. If, however, it is desired to make the scale more accurate, it is necessary only to hang a clothes suspending means from one fixed point on the outer end of lever 22, as from a hole drilled through the scale lever 22, as indicated at 88 in Fig. 1.

As above indicated, the main housing portion 2 of the scale may be swung from the operative position shown in Figs. 1 and 2 to a position in which the housing, and consequently the lever 22, will occupy a position vertical of the paper as the device is shown in Fig. 1. In the preferred embodiment, means is provided to hold main body 2 stably in either of such two positions. Such means takes the form of a projection 90 on the bottom of the spring seat washer 78, such projection cooperating with the two partially spherical depressions 92 and 94 on the upper surface of the arm 10 of the bracket 4. It will be seen that spring seat washer 78 is constantly pressed downward by reason of the action of coil spring 76. Thus, when the projection 90 is engaged in either of depressions 92 or 94, the housing 2 is held stably in the operative or the inoperative position, respectively. The depth of depressions 92 and 94 is not such, however, as to prevent the swinging of the housing 2 by the application of a reasonably moderate force thereto.

In the embodiment of the clothes scale shown, there is incorporated in the pivoting means for the housing a further means whereby, when the housing 2 is swung from the operative position shown in Fig. 2 to the inoperative position at right angles thereto, above described, the scale lever 22 is automatically allowed to pivot into a vertical position, in which it lies close to the supporting surface such as the wall of the washing machine. Such last named means, that is, the automatic scale lever lowering means, in the illustrative embodiment is incorporated in the mating surfaces of the parts 60 and 70, which are more clearly shown in Fig. 5. As can be seen in Figs. 4 and 5, part 70 is provided with a toothed lower end 96, and the plunger 60 is provided with a toothed upper end 98 complementary to the end 96. In the embodiment shown, two diametrically opposed teeth are provided on both ends 96 and 98, one such point on end 98 being designated 100. Tooth 100 has a vertical surface 102 lying parallel to the axis of members 60 and 70, the teeth on end 96, of which one is shown at 104, having similar vertical surfaces, that on tooth 104 being designated 106. Leading to the teeth on parts 60 and 70, in a direction toward the vertical surfaces thereon, are inclined surfaces. Such inclined surface on end 98 of part 60 leading up to surface 102 from the root or valley between teeth 100 is designated 108. The inclined surface on end 96 of part 70 leading down to vertical surface 106 from the root or valley between teeth 104 is designated 110. Head portion or cap 70 of the composite pivot pin 64 is keyed to the bracket 4 as described. With the plunger 60, which is held from rotation about its axis by reason of the engagement between the key member 58 and the slot 82, in the operative position shown in Fig. 3, the vertical surfaces of the teeth, that is surface 102 on part 60 and the surface corresponding to surface 106 on part 70 are in confronting relationship, with the peak of the teeth on one part substantially in contact with the valleys of the teeth on the other part. It will be apparent that, with the parts 60 and 70 in such relationship, the plunger 60 is permitted to slide freely vertically downward with respect to part 70.

When the housing, mounted in the position shown in Fig. 1, is pivoted into the inoperative position parallel with the supporting surface for the scale, it rotates in a direction toward the reader in Fig. 4. Thereupon the peaks of the teeth 100 and the inclined surfaces 108 leading up to the peaks of the teeth 100 on plunger 60 ride down the complementary inclined surfaces 110 leading to the roots or valleys of the teeth 104 on part 70, and the plunger 60 is thus driven downwardly. Such downward driving of the plunger results in the clockwise rotation of gear 46 and the counterclockwise rotation of gear 44, as the device is shown in Fig. 4, thereupon positively driving the scale lever 22 counterclockwise until gear teeth 30 and 32 become disengaged, so that lever 22 pivots downwardly into the inoperative, vertical, position in which it lies close to the supporting surface for the scale.

The scale of the present invention incorporates a further improvement over that shown in application Serial No. 127,409 by means of which the scale rejects or throws off an overload of clothing. The torque imposed upon lever 22 by coil spring 76 is not large enough to maintain the lever sufficiently elevated to retain clothing thereon, the combined torques contributed by springs 76 and 84 being required for this purpose. If, therefore, the torque imposing effect of spring 84 is disconnected from lever 22 when lever 22 is in operative, load sustaining, position, the lever 22 will fall, thereby letting the clothes hanging on it slip to the floor. Accordingly, in the device shown there is incorporated an escapement means, responsive to overload of lever 22, to disconnect the spring 84 from the train of mechanism through which it imposes torque upon lever 22.

In the embodiment shown such escapement means is constituted by the one-toothed spur gear 32 and the surface 31 forming a partial spur gear, which run out of engagement with each other when such overload is applied to lever 22. In a typical construction, the lever 22 is depressed to an angle of 15° when a load of 9 pounds is applied to it, and gear 32 and the surface 31 run out of engagement with each other when lever 22 is depressed to an angle of 20°, representing a total load on the lever of approximately 10½ pounds. In the range of loads from 0 to 9 pounds the indicator disc 38 turns 34°. When the gears 30 and 32 thus become disengaged by an overload on lever 22, the lever 22, under the overload drops toward the position shown in full in Fig. 9, since such travel is then opposed only by coil spring 76, whereupon the clothing on the lever slips off the lever to the floor. Lever 22 is restored to horizontal, operative, position wherein gear 32 and surface 31 are again in contact, by the lifting effect upon the lever after such overload has occurred, by coil spring 76 and plunger 60. The lever is similarly placed in operative, horizontal, position after the main body 12 of the scale is swung from the above described inoperative position parallel to the supporting surface to the operative position at right angles thereto.

When lever 22 is in depressed, inoperative, position, with gear 32 and surface 31 out of engagement with each other, there is a face-to-face engagement between the smooth, partially circular, surface 112 of the bottom of slot 28 on lever 22, to the right of the gear tooth depression 30 in Fig. 3, and the correspondingly shaped lower srface 114 on projection 116 on shaft 34. Projection 116 is integral with the one-toothed gear 32. Such engagement of surfaces 112 and 114 locks shaft 34 in position for gear 32 and surface 31 to reengage upon restoration of lever 22 to a horizontal position.

Although for purposes of illustration I have shown and described a preferred embodiment of the scale of the invention and have indicated a preferred application of the same, that is, for the weighing of clothes, it will be understood that the scale, within the scope of the invention, is capable of considerable variation as to details of construction and that it is capable of use to advantage in numerous applications. The invention is, therefore, defined by the scope of the claims appended hereto.

I claim as new the following:

1. A weighing device comprising a main housing, means to mount the housing on a supporting member, a load receiving scale lever pivoted in the housing, said lever having an outer arm projecting from the housing, the outer end of the scale lever lying substantially horizontal, an indicating means on the housing connected to the scale lever to indicate the amount of deflection of the lever, at least two means within the housing operatively connected with the scale lever yieldingly to oppose said deflection of the scale lever, and means responsive to the imposition of a substantial overload on the scale lever for disconnecting at least one of such last named means from the lever.

2. A weighing device comprising a main housing, means to mount the housing on a supporting member, a load receiving scale lever pivoted in the housing, said lever having an outer arm projecting from the housing, the outer end of the scale lever lying substantially horizontal, an indicating means on the housing connected to the scale lever to indicate the amount of deflection of the lever, at least two resilient means within the housing coacting with the scale lever yieldingly to oppose said deflection of the scale lever, means for permanently connecting the first of such resilient means to the lever when the weighing device is in operative condition, the second of such resilient means being disconnectable from the lever, when the weighing device is in operative condition, and means responsive to the imposition of a substantial overload on the scale lever for disconnecting the second resilient means from the lever.

3. A weighing device comprising a main housing, means to mount the housing on a supporting member, a load receiving scale lever pivoted in the housing, a pivot pin on the housing mounting the inner end of the scale lever, said scale lever having an outer arm projecting substantially horizontally from the housing, a motion multiplying means including a rotatable shaft and an indicating means thereon connected to the scale lever adjacent the pivot pin therefor to indicate the amount of deflection of the lever, and at least two resilient means within the housing coacting with the scale lever yieldingly to oppose said deflection of the scale lever, one of said resilient means comprising a plunger mounted for sliding movement in a vertical direction in the housing, a spring constantly urging the plunger in one direction, and means connecting the plunger and the scale lever, a second of such resilient means comprising a spring constantly opposing deflection of the indicating means and of the scale lever, a first partial gear on the shaft of the indicating means, a second partial gear meshing therewith on the inner end of the scale lever, the first partial gear being in operative, indicator means moving, contact with the second partial gear throughout the operative range of the weighing device, the first partial gear and the surface of the lever adjacent the second partial gear thereon being so constructed and arranged that when a substantial overload is imposed on the scale lever the first and second partial gears are disconnected so that the scale lever then coacts only with the first of such resilient means.

4. A weighing device comprising a main housing, means to mount the housing on a supporting member, a load receiving scale lever pivoted in the housing, a pivot pin on the housing mounting the inner end of the scale lever, said scale lever having an outer arm projecting substantially horizontally from the housing, a motion multiplying means including a rotatable shaft and an indicating means thereon connected to the scale lever adjacent the pivot pin therefor to indicate the amount of deflection of the lever, and two resilient means within the housing coacting with the scale lever yieldingly to oppose said deflection of the scale lever, one of said resilient means comprising a plunger mounted for sliding movement in a vertical direction in the housing, a spring constantly urging the plunger in one direction, and means connecting the plunger and the scale lever, the second of such resilient means comprising a spring constantly opposing deflection of the indicating means and of the scale lever, a one-toothed gear on the shaft of the indicating means, a tooth-receiving depression on the inner end of the scale lever, one side of the one-toothed gear being in operative, indicator means moving, contact with one side of the depression throughout the operative range of the weighing device, the one-toothed gear and the surface of the lever adjacent the depression therein being so constructed and arranged that when a substantial overload is imposed on the scale lever the one-toothed gear and the depression on the scale lever are disconnected so that the scale lever then coacts only with the first of such resilient means.

5. A weighing device comprising a main housing, means to mount the housing on a supporting member, a load receiving scale lever pivoted in the housing, a pivot pin on the housing mounting the inner end of the scale lever, said scale lever having an outer arm projecting substantially horizontally from the housing, a motion multiplying means including a rotatable shaft and an indicator means thereon connected to the scale lever adjacent the pivot pin therefor to indicate the amount of deflection of the lever, and two resilient means within the housing coacting with the scale lever yieldingly to oppose said deflection of the scale lever, one of said resilient means comprising a plunger mounted for sliding movement in a vertical direction in the housing, a spring constantly urging the plunger in one direction, and means connecting the plunger and the scale lever, the second of such resilient means comprising a spring constantly opposing deflection of the indicating means and of the scale lever, a first partial gear on the shaft of the indicating means, a second partial gear meshing therewith on the inner end of the scale lever, the first partial gear being in operative, indicator means moving, contact with the second partial gear throughout the operative range of the weighing device, the first partial gear and the surface of the lever adjacent the second partial gear thereon being so constructed and arranged that when a substantial overload is imposed on the scale lever the first and second partial gears are disconnected so that the scale lever then coacts only with the first of such resilient means, and means to lock the indicator shaft against rotation when the first and second partial gears are thus disconnected.

6. A weighing device comprising a main housing, means to mount the housing on a supporting member, a load receiving scale lever pivoted in the housing, a pivot pin on the housing mounting the inner end of the scale lever, said scale lever having an outer arm projecting substantially horizontally from the housing, a motion multiplying means including a rotatable shaft and an indicator means thereon connected to the scale lever adjacent the pivot pin therefor to indicate the amount of deflection of the lever, and two resilient means within the housing coacting with the scale lever yieldingly to oppose said deflection of the scale lever, one of said resilient means comprising a plunger mounted for sliding movement in a vertical direction in the housing, a spring constantly urging the plunger in one direction, and means connecting the plunger and the scale lever, the second of such resilient means comprising a spring constantly opposing deflection of the indicating means and of the scale lever, an enlargement on the shaft of the indicating means, a one-toothed gear on said enlargement, a depression receiving such one-toothed gear on the inner end of the scale lever, one side of the one-toothed gear being in operative, indicator means moving, contact with one side of the depression throughout the operative range of the weighing device, the one-toothed gear and the surface of the lever adjacent the depression therein being so constructed and arranged that when a substantial overload is imposed on the scale lever the one-toothed gear and the depression on the scale lever are disconnected, so that the scale lever then coacts only with the first of such resilient means, and means to lock the indicator shaft against rotation when the one-toothed gear and the depression in the scale lever are thus disconnected, said last named means comprising a first, concave, surface on the enlargement on the shaft of the indicating means adjacent the one-toothed gear, and a second, convex, surface on the scale lever adjacent the depression therein, said two curved surfaces lying on an imaginary cylinder having its axis coincident with the pivotal axis of the scale lever, said two curved surfaces being in contact when the one-toothed gear and the depression on the scale lever are disconnected.

7. A weighing device comprising a main housing, means to mount the housing on a supporting member, a load receiving scale lever pivoted in the housing, said lever having an outer arm projecting from the housing, the outer end of the scale lever lying substantially horizontal when it is in operative position, an indicating means on the housing connected to the scale lever to indicate the amount of deflection of the lever, at least two resilient means within the housing coacting with the scale lever yieldingly to oppose said deflection of the scale lever, means for permanently connecting the first of such resilient means to the lever when the weighing device is in operative condition, the second of such resilient means comprising a spring constantly opposing deflection of the indicating means and of the scale lever, a gear train including at least two gears connecting the second resilient means to the scale lever, the gears of said gear train being in operative mesh throughout the operative range of the weighing device, at least two of the gears of said gear train being so constructed and arranged that they run out of positive mesh with each other and thus disconnect the second resilient means from the scale lever when a substantial overload is imposed on the scale lever.

8. A weighing device comprising a main housing, means to mount the housing on a supporting member, a load receiving scale lever pivoted in the housing, said lever having an outer arm projecting from the housing, the outer end of the scale lever lying substantially horizontal when it is in operative position, an indicating means on the housing connected to the scale lever to indicate the amount of deflection of the lever, at least two resilient means within the housing coacting with the scale lever yieldingly to oppose said deflection of the scale lever, means for permanently connecting the first of such resilient means to the lever when the weighing device is in operative condition, the second of such resilient means comprising a spring constantly opposing deflection of the indicating means and of the scale lever, a gear train connecting such spring to the scale lever, such gear train including a first partial spur gear and a second partial spur gear meshing therewith throughout the operative range of the weighing device, the first and second partial gears being so constructed and arranged that when a substantial overload is imposed on the scale lever to deflect it past a predetermined angle the first and second partial gears are disconnected so that the scale lever then coacts only with the first of such resilient means.

9. A weighing device comprising a housing, a deflectable load receiving member supported by the housing, an indicating means on the housing connected to the member to indicate the amount of deflection of the member, at least two means within the housing operatively connected with the member yieldingly to oppose said deflection of the member, and means responsive to the imposition of a substantial overload on the member for disconnecting at least one of such last named means from the member.

10. A weighing device comprising a housing, a deflectable load receiving member supported by the housing, an indicating means on the housing connected to the member to indicate the amount of deflection of the member, at least two resilient means within the housing coacting with the member yieldingly to oppose said deflection of the member, means for permanently connecting the first of such resilient means to the member when the weighing device is in operative condition, the second of such resilient means being disconnectable from the lever when the weighing device is in operative condition, and means responsive to the imposition of a substantial overload on the member for disconnecting the second resilient means from the member.

11. A weighing device comprising a housing, a deflectable load receiving member supported by the housing, an indicating means on the housing connected to the load receiving member to indicate the amount of deflection of the member, at least two resilient means within the housing coacting with the member yieldingly to oppose said deflection of the member, means for permanently connecting the first of such resilient means to the member when the weighing device is in operative condition, the second of such resilient means comprising a spring constantly opposing deflection of the indicating means and of the member, a gear train including at least two gears connecting the second resilient means to the member, the gears of said gear train being in operative mesh throughout the operative range of the weighing device, at least two of the gears of said gear train being so constructed and arranged that they run out of positive mesh with each other and thus disconnect the second resilient means from the member when a substantial overload is imposed on the member.

12. A weighing device comprising a housing, a deflectable load receiving member supported by the housing, an indicating means on the housing connected to the deflectable member to indicate the amount of deflection of the member, at least two resilient means within the housing coacting with the member yieldingly to oppose said deflection of the member, means for permanently connecting the first of such resilient means to the member when the weighing device is in operative condition, the second of such resilient means comprising a spring constantly opposing deflection of the indicating means and of the member, a gear train connecting such spring to the member, such gear train including a first partial spur gear and a second partial spur gear meshing therewith throughout the operative range of the weighing device, the first and second partial gears being so constructed and arranged that when a substantial overload is imposed on the member to deflect it past a predetermined point the first and second partial gears are disconnected so that the deflectable member then operatively coacts only with the first of such resilient means.

HENRY F. HOWARD.

References Cited in the file of this patent

UNITED STATES PATENTS

| Number | Name | Date |
|---|---|---|
| 282,645 | Kingwill | Aug. 7, 1883 |
| 2,003,737 | Butler | June 4, 1935 |
| 2,094,584 | Cox | Oct. 5, 1937 |
| 2,157,574 | Siesel | May 9, 1939 |
| 2,172,561 | Kruse | Sept. 12, 1939 |
| 2,589,599 | Bond | Mar. 18, 1952 |

FOREIGN PATENTS

| Number | Country | Date |
|---|---|---|
| 621,943 | Germany | Nov. 15, 1935 |